United States Patent [19]

Valerio

[11] 4,098,523
[45] Jul. 4, 1978

[54] TRACTION DEVICE

[76] Inventor: Michael R. Valerio, 1780 Benjiman Rd., North Madison, Ohio 44057

[21] Appl. No.: 687,866

[22] Filed: Jun. 7, 1976

[51] Int. Cl.² ............................................ B60G 11/04
[52] U.S. Cl. ............................... 280/718; 180/73 TL; 267/67
[58] Field of Search ............... 280/718, 720, 688, 689, 280/669; 180/71, 73 R, 73 TL; 267/66, 67, 52, 36 R

[56] References Cited

U.S. PATENT DOCUMENTS

| 1,970,859 | 8/1934 | Lenze | 180/73 R |
|---|---|---|---|
| 2,755,097 | 7/1956 | Elconin | 280/680 |
| 2,852,248 | 9/1958 | Travilla | 267/67 |
| 3,191,711 | 6/1965 | Conner | 180/71 |
| 3,406,957 | 10/1968 | Almquist | 267/67 |
| 3,695,605 | 10/1972 | Gross | 267/66 |
| 3,704,876 | 12/1972 | Schubeck | 280/718 |
| 3,788,629 | 1/1974 | Johnson | 267/66 |

FOREIGN PATENT DOCUMENTS 461,435  4/1913  France ............................ 267/67

Primary Examiner—Joseph F. Peters, Jr.
Assistant Examiner—John A. Carroll
Attorney, Agent, or Firm—Teare, Teare & Sammon

[57]  ABSTRACT

A traction device for maximizing traction between the rear wheels of a motor vehicle and a road surface including an elongated telescopically adjustable tubular assembly pivotally mounted between the rear wheel axle and the rear spring. The telescopic assembly has an outer elastomeric cushioning ring disposed between the flanges of two outer sleeves one of which is slidable on and the other of which is fixed to an inner sleeve.

9 Claims, 2 Drawing Figures

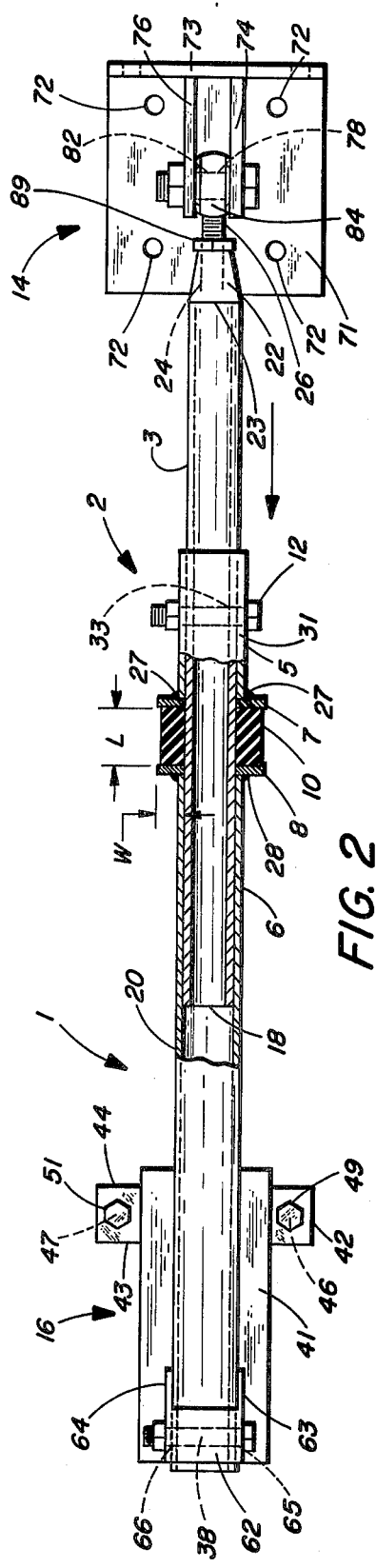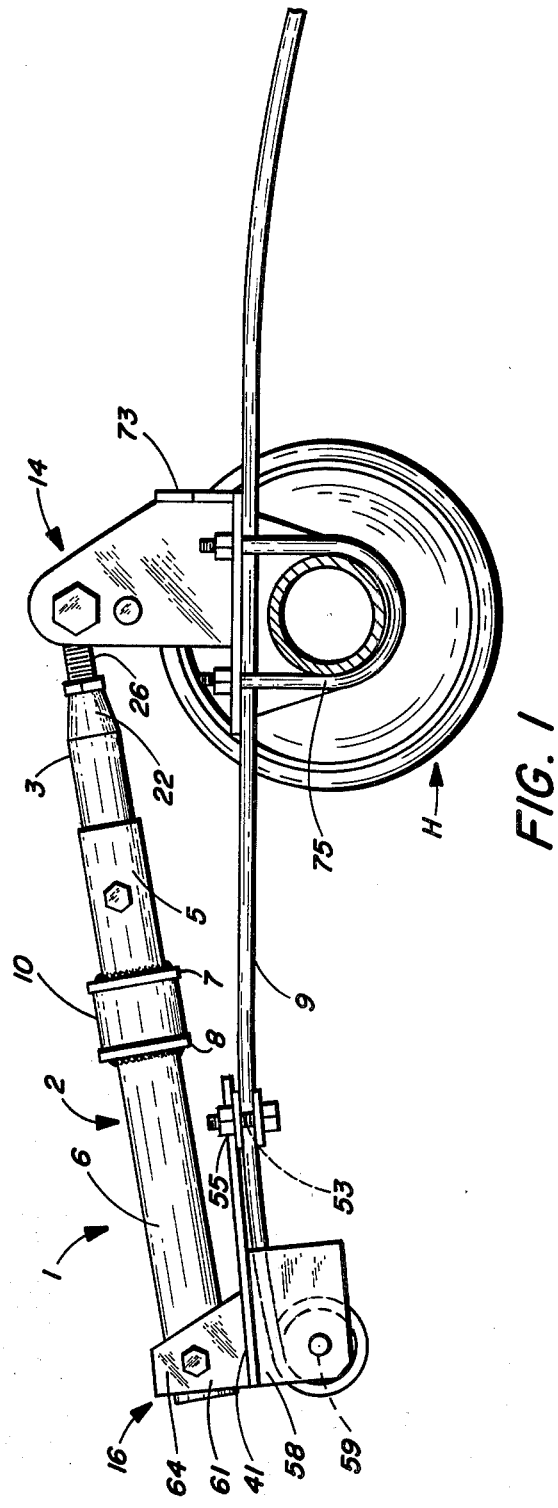

TRACTION DEVICE

BACKGROUND OF THE INVENTION

The present invention relates to motor vehicle components, and more particularly to traction devices adapted for enhancing the contact and hence, friction forces between the rear wheels of a motor vehicle, such as a drag racing car or the like, and the road surface during acceleration.

In drag racing, tremendous acceleration of the vehicle occurs. During this acceleration, the forces on the rear spring, and the rapid acceleration of the wheels, results in decreased contract of the rear wheels with the road surface resulting in wheel hopping or inadequate traction due to less than optimum transfer of weight to the rear wheels of the vehicle. In order to overcome the decrease in traction, an elongated bar, termed a traction bar, is secured to the rear axle housing and spring for each rear wheel.

One of the problems with the previous devices has been that the shock exerted on the device during high speed acceleration caused damage to the traction bar decreasing the life thereof and possibly resulting in fracture of the device during operation. Such fracture tends to occur at weak points in the device, such as at weldments.

Another problem has related to the achievement of maximum weight transfer to the rear wheels for optimum acceleration.

A still further problem is in providing an easily adjustable device that is rugged and able to stand up to the vigors of drag racing.

SUMMARY OF THE INVENTION

The pesent invention includes a telescopic tubular assembly pivotally mounted between the rear axle housing of the vehicle and the rear leaf spring. An inner elongated member which, in the preferred embodiment is pivotally and adjustably connected to the rear axle housing telescopically fits inside first and second outer elongated members which are spaced from each other in resilient and cushioning relationships by an elastomeric member which is disposed between the flange-like terminations of the first and second outer members. One of the members is fixably secured to the inner member at a predetermined location, while the other outer member is slidably disposed on the inner member. In the preferred embodiment, the slidable outer member is pivotally secured to the spring. By the foregoing arrangement, the shock upon the traction bar during acceleration is adequately cushioned to enhance the the life of the device while at the same time providing a maximizing of the traction between the rear wheel and the road.

BRIEF DESCRIPTION OF THE DRAWINGS

FIG. 1 is an elevation view of a traction device in accordance with the present invention mounted between the rear axle housing and the rear leaf spring, and FIG. 2 is an elongated bottom view of the traction bar assembly of FIG. 1, with a portion of the assembly being broken away and a portion shown in cross-section for clarity.

DESCRIPTION OF THE PREFERRED EMBODIMENTS

Referring to FIG. 2, a traction device embodying the present invention is shown generally at 1. As shown, the device includes an elongated telescopic portion shown generally at 2 suspended between the rear axle housing 4 and the spring 9. As shown in FIG. 2, the telescopic portion 2 includes an elongated inner member 3 fixably attached intermediate its ends to a first outer elongated member 5 and slidably receiving adjacent its proximal end a second outer elongated member 6 elastomeric member 10 is disposed about the inner member 3 between the proximal flanges 7 and 8 of the respective outer members 5 and 6. The telescopic arrangement is disposed in position by the distal end of the elongated inner member 3 being pivotally and axially adjustably attached to the rear axle housing by the bracket arrangement shown generally at 14 and by the second outer member 6 being pivotally secured to the leaf spring by the bracket arrangement showed generally at 16. By the foregoing arrangement, a readily adjustable, strong, traction bar, despite the presence of weldments, is provided which has a long life and which maximizes traction during acceleration.

The inner elongated member 3 of the telescopic assembly has an elongated body portion, 20 a receptacle 22 adjacent its distal and, where the inner member 3 is hollow, with an open proximal end 18. The member 3 is preferably of a hollow metal construction and may be either curved or polygonal in the cross-section. The body portion 20 of the inner member 3 has an aperture 33 intermediate the ends of the body for receiving a through bolt, as at 12, for securing the inner member 3 to the first outer elongated member 5. The receptable 22 adjacent the distal end of the inner member 3 is preferably tapered and has an internal thread, as at 24, for receiving the turn screw 26 for axially adjusting the inner member 3 relative to the second outer member 6 to accommodate different size vehicles. The receptacle 22 may be integral with the body portion 20 of the inner member 3 or may be welded thereto, as at 23. The first outer member 5 is a hollow metalic sleeve having a radially outwardly projecting flange 7 affixed thereto at the proximal end of the member 5 as by weldments 27. The first outer member 5 is open at both ends and has an axial passage extending therethrough and conforming generally in shape to the outer shape of the inner member 3 but with the passageway having its transverse inner dimension being slightly greater than the outer dimension of the inner member 3 so as to allow the outer member 5 to be slid into place during assembly. The outer member 5 has an aperture 31 sisposed between its ends for receiving through bolt 12.

The second outer member 6 has an intermediate body portion, a radially outwardly extending flange 8 attached adjacent the distal end of the outer member 6 as by weldments at 28 and an aperture 32 adjacent its distal end for pivotally securing the second outer member 6 to the mounting bracket 16. The second outer member 6 is a hollow metalic sleeve having an axial central passageway generally conforming in shape to the outer transverse periphery of the inner member 3, the member 6 is of slightly greater dimension (diameter) whereby the outer member 5 is free to slide on the inner member 3 when the telescopic device is subjected to sufficient forces to cause a compression of the elastomeric member 10.

The elastomeric member 10 is an endless band original construction made of a material of a relatively hard characteristic such as rubber of a durometer of 65-70. The elastomeric member 10 is relatively long in its axial dimension "L", such as being as long as the transverse dimension of the inner member, 3. Similarly, the elastomeric member 10 is relatively thick, whereby its widthwise dimension W is one-half the transverse dimension of the inner member 3. The transverse width W is less than the radial height flanges 7 and 8. The inner shape and dimension of the elastomeric member 10 generally corresponds to the outer shape of the inner elongated member 3, but with the inner dimensions of the elastomeric member 10 being slightly larger than the outer dimension of the inner member 3 to provide a sliding fit thereon. The aforesaid durometer, width and length are selected to provide sufficient movement of the outer member 6 and adequate cushioning whereby the forces exerted on the connection between the first outer member 5 and the inner member 3 as well as of the connections between the inner member 3 and outer member 6 and their respective mountings to the vehicle during acceleration to provide sufficient compression to the elastomeric member 10 and proper distribution of the area of shock, combined with relative movement of the outer member 6 on the inner member 3, to minimize damage to the device when in operation.

The second outer member 6 is pivotally mounted to the spring 9 by the bracket arrangement shown generally at 16. The spring is shown with only one leaf, for purposes of illustration. It is understood, however, that the actual spring may have several leaves, as desired. The bracket 16 arrangement has a base plate 41 having lateral extensions 42 and 43 adjacent one end, such as formed by a cross-plate 44 welded to the base 41 and having apertures 46 and 47 to receive through bolts 49 and 51 which pass through corresponding apertures, as at 53, in the leaf spring 9, the bolts 49, 51 are fastened in place as by nuts 55. The base plate 41 has upstanding side portions, such as 58, welded to the base plate 41, and having aperture 59 therein to receive the pin for mounting one end of spring 9 to the vehicle chassis (not shown). The base plate 41 also has depending brackets, as at 61, attached thereto, such as by welding, and having a base portion 62 and a pair of side plates 63 and 64, which have apertures 65 and 66 therein to provide a journal for mounting through bolt 38 which is secured in place. By such arrangement, the second outer member 6 of the telescopic device 2 is mounted for sliding movement on the inner member 3 to compress the elastomeric member 10 when the spring 9, upon downward movement thereof.

The radially inner member 3 of telescoping device 2 is pivotally and adjustably mounted adjacent its axially outer end to the bracket arrangement shown generally at 14. The bracket 14 has a base plate 71 with spaced apertures 72 therein whereby the bracket is secured to the housing by the hang bolt 75 (FIG. 1) which secures the leaf-spring to the rear axle housing, as is known in the art. The base plate 71 has a depending back plate 73 and a pair of depending side plates 74 and 76, journaled to receive a pivot 78 in the form of a through bolt. A pivot member 84 having a cross channel 82 is mounted on the through bolt 78 for vertically pivotal movement thereon, and has an internally threaded portion 84 adapted to receive the turn screw 26. Lock nut 89 is mounted on screw 26 for locking the screw 26 relative to the inner member 3.

In assembling the device of the present invention, the mounting bracket arrangement 14 is attached to the rear axle housing and the mounting bracket arrangement 16 is attached to the spring 9 as indicated. The second outer member 6 is pivotally mounted on the bracket 16 by bolt 32. The inner elongated member 3 is slid inside the outer member 6 and the elastomeric member 10 is slid over the inner member 3 until its abuts flange 8 of the outer member 6. The first outer member 5 is then slid over the inner member 3 until flange 7 abuts the elastomeric member 10, with aperture 31 in alignment with aperture 33. The first outer member 5 is then secured to the inner member 3 by through bolt 12. The telescopic assembly is then pivoted into alignment with the internal threaded opening 24 of the pivot member 84. It is understood that the screw 26 is first inserted sufficiently inside the receptacle 23 of the inner member 3 to permit such pivotal alignment. The screw 26 is then screwed into the pivot member 81 and the lock nut 89 is then tightened against inner member 3 to lock the device in place. By the foregoing arrangement, the same amount of compression is applied against the elastomeric member 10 regardless of the span between the rear axle and the place where the traction device is mounted on the spring, and thus the device is adjustable to automobiles of different sizes, thereby to provide a simple dependable and long life device to maximize traction.

I claim:

1. A traction bar assembly for a motor vehicle comprising,
    an inner elongated member having a longitudinal axis,
    a first hollow outer elongated member encompassing a portion of said inner elongated member,
    a second hollow outer elongated member encompassing a portion of said inner elongated member and spaced from said first hollow member along said longitudinal axis,
    a compressable member disposed between said outer elongated members,
    one of said elongated members being adapted for connection to a vehicle's wheel axle housing, and
    another of said elongated members being adapted for connection to a vehicle's spring.

2. A traction bar assembly in accordance with claim 1, wherein,
    said first elongated member is fixably secured to said inner member and said second elongated member is slidable on said inner member.

3. A traction bar assembly in accordance with claim 2 wherein,
    at least one of said inner and second outer elongated members is adapted for pivotal mounting adjacent its distal end from said compressable member and the other of said elongated members is adapted at least for axially adjustable movement.

4. A traction bar assembly in accordance with claim 2, wherein,
    said second outer elongated member is adapted for pivotal mounting and wherein said inner member is adapted for axially adjustable mounting.

5. A traction bar assembly in accordance with claim 1, wherein, said compressable member is elastomeric.

6. A traction bar assembly in accordance with claim 1, wherein, said first outer member and second outer member terminate in flanges adapted to engage said compressable member in assembled position.

7. A traction bar assembly in accordance with claim 3, including a mounting means for a suspension spring of the vehicle pivotally mounting the elongated member adapted for pivotal mounting and mounting means for pivotally and adjustably mounting the elongated member adapted for adjustable mounting.

8. A traction bar assembly in accordance with claim 7, including mounting means for mounting one of said elongated members in pivotal arrangement to the free end of a bracket means which is cantilevered from the spring.

9. An assembly according to claim 1 including, mounting means fixed to a vehicle housing and to which one of said elongated members is pivotally attached, and mounting means fixed to a vehicle spring and to which another of said elongated members is pivotally attached.

* * * * *